(12) United States Patent
Cheung et al.

(10) Patent No.: US 8,009,729 B2
(45) Date of Patent: Aug. 30, 2011

(54) SCALER ARCHITECTURE FOR IMAGE AND VIDEO PROCESSING

(75) Inventors: Joseph Cheung, San Diego, CA (US); Ananthapadmanabhan A. Kandhadai, San Diego, CA (US); George Gaozhi Pan, San Diego, CA (US); Sumit Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1405 days.

(21) Appl. No.: 11/360,137

(22) Filed: Feb. 22, 2006

(65) Prior Publication Data

US 2007/0121733 A1    May 31, 2007

Related U.S. Application Data

(60) Provisional application No. 60/741,347, filed on Nov. 30, 2005.

(51) Int. Cl.
*H04N 11/04* (2006.01)

(52) U.S. Cl. ......... 375/240.01; 375/240.02; 375/240.16; 375/240.24

(58) Field of Classification Search ............. 375/240.02, 375/240.16, 240.24, 240.01
See application file for complete search history.

(56) References Cited

U.S. PATENT DOCUMENTS

| | | | |
|---|---|---|---|
| 6,546,052 B1 * | 4/2003 | Maeda et al. | 375/240.08 |
| 2002/0012055 A1 | 1/2002 | Koshiba et al. | |
| 2004/0151242 A1 | 8/2004 | Chang | |
| 2004/0158878 A1 | 8/2004 | Ratnakar et al. | |
| 2005/0213830 A1 | 9/2005 | Nagashima | |

FOREIGN PATENT DOCUMENTS

| | | |
|---|---|---|
| CN | 1694159 | 11/2005 |
| EP | 1594314 A2 | 11/2005 |
| JP | 2000312327 A | 11/2000 |
| JP | 2004193686 | 8/2004 |
| JP | 2005277908 A | 10/2005 |
| JP | 2006516868 | 7/2006 |
| KR | 20050098287 | 10/2005 |
| WO | WO2004068849 | 8/2004 |

OTHER PUBLICATIONS

International Search Report—PCT/US06/061430—International Search Authority—European Search Authority—Nov. 20, 2007.
Chengjie Tu et al: "Over-sampled and under-sampled Pre/post-filters for block DCT coders" Image processing, 2004. ICIP 2004, International Conference on Singapore Oct. 24-27, 2004. Piscataway, NJ, USA, IEEE, Oct. 24, 2004 pp. 1277-1280, XP010785435.
Written Opinion—PCT/US06/061430, International Search Authority, European Patent Office, Nov. 20, 2007.

* cited by examiner

*Primary Examiner* — Ted M Wang
(74) *Attorney, Agent, or Firm* — John Rickenbrode

(57) ABSTRACT

This disclosure describes a scaler architecture for image and/or video processing. One aspect relates to an apparatus comprising an image processing unit, a memory, and a coder. The memory is configured to store processed image data from the image processing unit. The coder is configured to retrieve the stored, processed image data from the memory. The coder comprises a scaler configured to upscale the retrieved image data from the memory. The coder is configured to encode the scaled image data.

18 Claims, 3 Drawing Sheets

SCALER ARCHITECTURE FOR IMAGE AND VIDEO PROCESSING

CLAIM OF PRIORITY UNDER 35 U.S.C. §119

The present application claims priority to co-assigned U.S. Provisional Application No. 60/741,347, entitled "POWER AND AREA EFFICIENT SCALAR ARCHITECTURE FOR EMBEDDED VIDEO PROCESSING APPLICATIONS," filed on Nov. 30, 2005, which is hereby incorporated herein by reference in its entirety.

TECHNICAL FIELD

The present application relates to image and/or video processing, and more particularly, to a scaler architecture for image and/or video processing.

BACKGROUND

Image sensors for video applications may sample a scene with a color filter array (CFA) arranged on a surface of the sensor. A variety of CFA patterns may be used, and a digital signal processor (DSP) may obtain three color values for each photosite. Image processing techniques may be used to obtain high quality, color video images. These image processing techniques may be referred to as "front-end" image processing because it generally precedes image compression or other video coding by a video coding unit. Alternatively, these image processing techniques may be referred to as "post processing" since the processing occurs after images are captured by image sensors.

Image frames of a video sequence generated from an image sensor may be processed by one or more image processing techniques. Examples of image processing techniques include color correction and demosaicing. Image processing may improve visual image quality attributes, such as tone reproduction, color saturation, hue reproduction and sharpness.

A number of video processing and coding techniques have been used for communicating digital video sequences. For example, the Moving Picture Experts Group (MPEG) has developed a number of video coding standards, such as MPEG-1, MPEG-2 and MPEG-4. Other standards include ITU H.263 and ITU H.264.

Some video coding techniques and standards may use graphics and video compression algorithms to compress data. Some compression algorithms may exploit temporal or inter-frame correlation and provide inter-frame compression. Inter-frame compression techniques may exploit data redundancy across frames by converting pixel-based representations of image frames to motion representations.

Some video compression techniques may use similarities within image frames, i.e., spatial or intra-frame correlation, to provide intra-frame compression, in which motion representations within an image frame can be further compressed. Intra-frame compression may use processes for compressing still images, such as discrete cosine transform (DCT) transformation.

SUMMARY

Image processing may present problems for real-time video encoding in real-time video telephony (VT) applications. For example, in order to ensure real-time transmission of video sequences, all image processing steps may need to be performed very quickly. Thus, real-time image processing may require a high bandwidth memory and large memory capacity to execute extensive image processing, typically by several different image processing modules. Memory bandwidth and memory space may be limited for some video coding devices, such as handheld mobile phones.

One aspect relates to an apparatus comprising an image processing unit, a memory, and a coder. The memory is configured to store processed image data from the image processing unit. The coder is configured to retrieve the stored, processed image data from the memory. The coder comprises a scaler configured to upscale the retrieved image data from the memory. The coder is configured to encode the upscaled image data.

Another aspect relates to a method comprising processing image data; storing the processed image data; retrieving the stored image data; scaling the retrieved image data; and encoding the scaled image data.

The details of one or more embodiments are set forth in the accompanying drawings and the description below. Other features, objects, and advantages will be apparent from the description and drawings, and from the claims.

DETAILED DESCRIPTION

Digital video capabilities may be incorporated into a wide range of devices, such as digital televisions, digital cameras, digital direct broadcast systems, wireless communication devices, portable digital assistants (PDAs), laptop computers, desktop computers, direct two-way communication devices (sometimes referred to as "walkie-talkies"), and radiotelephones such as cellular, satellite or terrestrial-based radiotelephones. These devices may create, modify, transmit, store, and play full motion video sequences.

Figure 1:
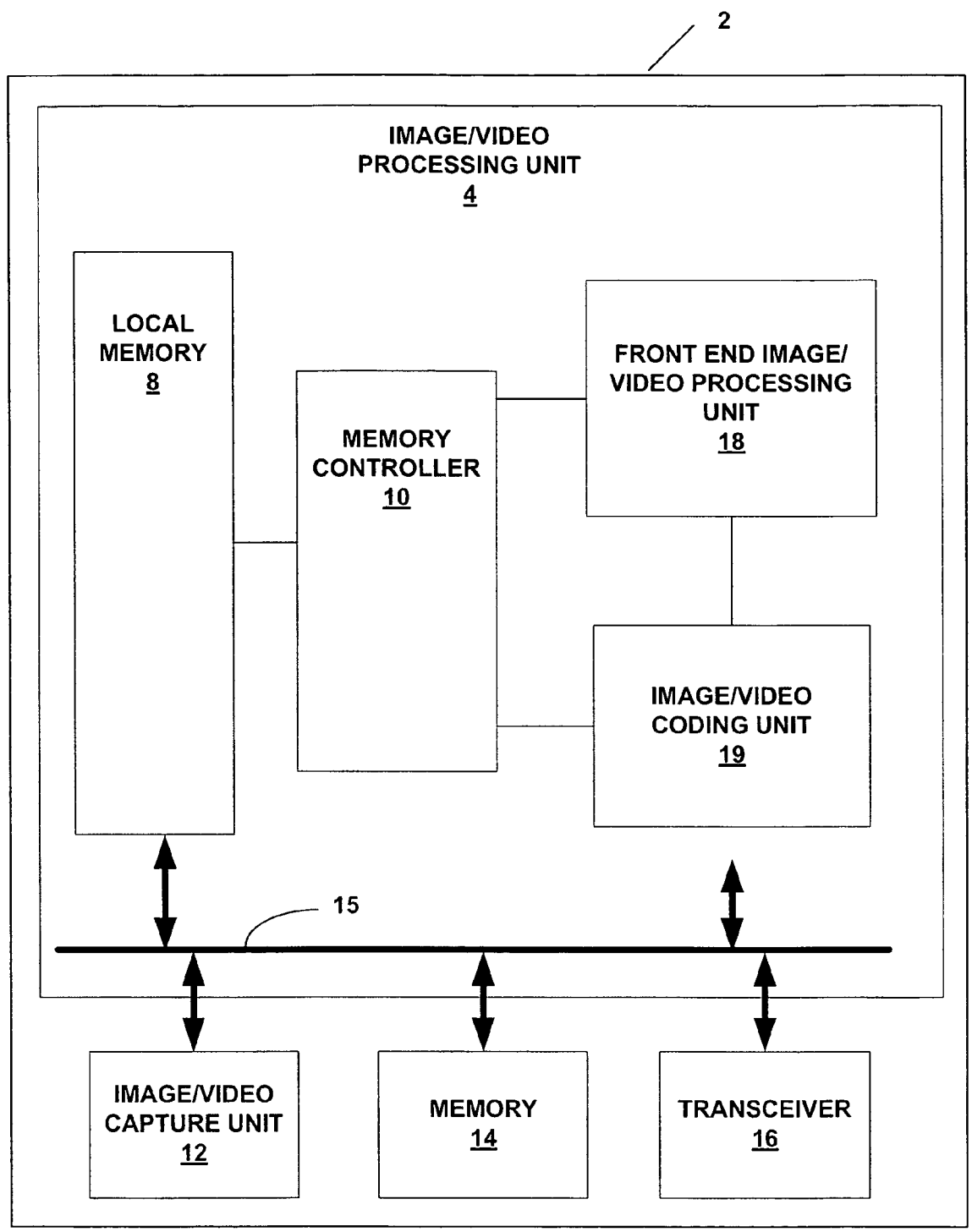
FIG. 1 illustrates a device configured to process digital images and/or digital video.

FIG. 1 illustrates a device 2 configured to process digital images and/or digital video. The device 2 may represent or be implemented in a digital television, a digital direct broadcast system, a wireless communication device, a personal digital assistant (PDA), a laptop computer, a desktop computer, a digital camera, a digital recording device, a network-enabled digital television, a cellular or satellite radio telephone, or any telecommunication device with video telephony (VT) capabilities.

The device 2 may process, encode, decode, transmit and/or receive image and/or video data. The video data may be captured by a video camera, such as a video capture unit (or image sensor) 12, retrieved from a video archive, or obtained in another manner. A video coding unit 19 in the device 2 may use a video coding standard such as MPEG-4, ITU-T H.263, ITU-T H.264, or any other video coding standard. The video coding unit 19 may support inter-frame coding techniques, such as motion estimation and motion compensation, and intra-frame coding techniques, such as spatial estimation and intra-prediction coding techniques.

The device 2 may include an image/video capture device 12, such as a camera or video camera, to capture images or video sequences and store the captured images or sequences in a memory 14. An image/video processing unit 4 may process images and/or video sequences. The memory 14 may store the images and/or video sequences before and after such processing.

A transceiver 16 may receive and/or transmit coded video sequences to another device. The transceiver 16 may use a wireless communication standard such as code division multiple access (CDMA). Examples of CDMA standards include CDMA 1xEV-DO, WCDMA, etc.

One or more elements of the device 2 may be communicatively coupled via a communication bus 15. In addition to or instead of the elements shown in FIG. 1, other elements may be included in the device 10. The architecture illustrated in FIG. 1 is merely an example. The techniques described herein may be implemented with a variety of other architectures.

The memory 14 may have a relatively large memory space. The memory 14 may comprise dynamic random access memory (DRAM), or FLASH memory. The memory 14 may comprise "NOR" or "NAND" gate memory technology, or any other data storage technology. In other examples, the memory 14 may comprise a non-volatile memory or any other type of data storage unit.

The image/video processing unit 4 may comprise a chip set for a mobile radiotelephone, which may include hardware, software, firmware, and/or one or more microprocessors, digital signal processors (DSPs), application specific integrated circuits (ASICs), field programmable gate arrays (FPGAs), or various combinations thereof. The processing unit 4 may include a local memory 8 coupled to a front-end image/video processing unit 18 and an image/video coding unit 19. The coding unit 19 may comprise an encoder/decoder (CODEC) for encoding (or compressing) and decoding (or decompressing) digital video data.

The local memory 8 may comprise a smaller and faster memory space relative to the memory 14. For example, the local memory 8 may comprise synchronous dynamic random access memory (SDRAM). The local memory 8 may comprise "on-chip" memory integrated with the other components of the processing unit 4 to provide fast access to data during a processor-intensive coding process. However, the memories 14 and 8 may be combined into one memory, or may be implemented in a number of other configurations. A memory controller 10 may control memory fetches and writebacks to the local memory 8.

The front-end image/video processing unit 18 may perform one or more image processing techniques on the frames of a video sequence to improve image quality, and thereby improve the quality of a video sequence. For example, the front-end image/video processing unit 18 may perform techniques such as demosaicing, lens rolloff correction, scaling, color correction, color conversion, and spatial filtering. The front-end image/video processing unit 18 may also perform other techniques. In general, the techniques performed by the unit 18 are referred to as "front-end" image processing techniques because the techniques precede coding by the image/video coding unit 19.

The image/video capture unit 12 may comprise image sensors that include color filter arrays (CFAs) arranged on a surface of the sensors. Front-end image processing performed by the unit 18 may improve the quality of the video sequence captured by the capture unit 12. For example, the front-end processing unit 18 and/or the coding unit 19 may comprise a DSP programmed to process images captured by the capture unit 12. The same area of memory 8 (or memory 14) may used for both front-end image processing purposes and for other storage purposes.

The image/video coding unit 19 may perform image and/or video coding, which may include one or more video compression techniques, such as inter-frame compression and/or intra-frame compression. For example, the coding unit 19 may implement motion estimation and motion compensation techniques to exploit temporal or inter-frame data correlation to provide inter-frame compression. Alternatively or additionally, the coding unit 19 may perform spatial estimation and intra-prediction techniques to exploit spatial or intra-frame data correlation to provide intra-frame compression. The output of motion compensation (or intra-prediction) is referred to as "residual," and may comprise a block of data indicative of differences between a current video block to be coded and a prediction block identified by motion estimation or spatial estimation.

After the coding unit 19 performs motion compensation (or intra-prediction) to create the residual, a series of additional steps may be performed to further code the residual and further compress the data. The additional steps may depend on the coding standard being used, but are generally referred to as "residual coding." The coding unit 19 may perform one or more of these video compression techniques to reduce the amount of data needed to communicate a video sequence to another device via the transceiver 16.

Figure 2:
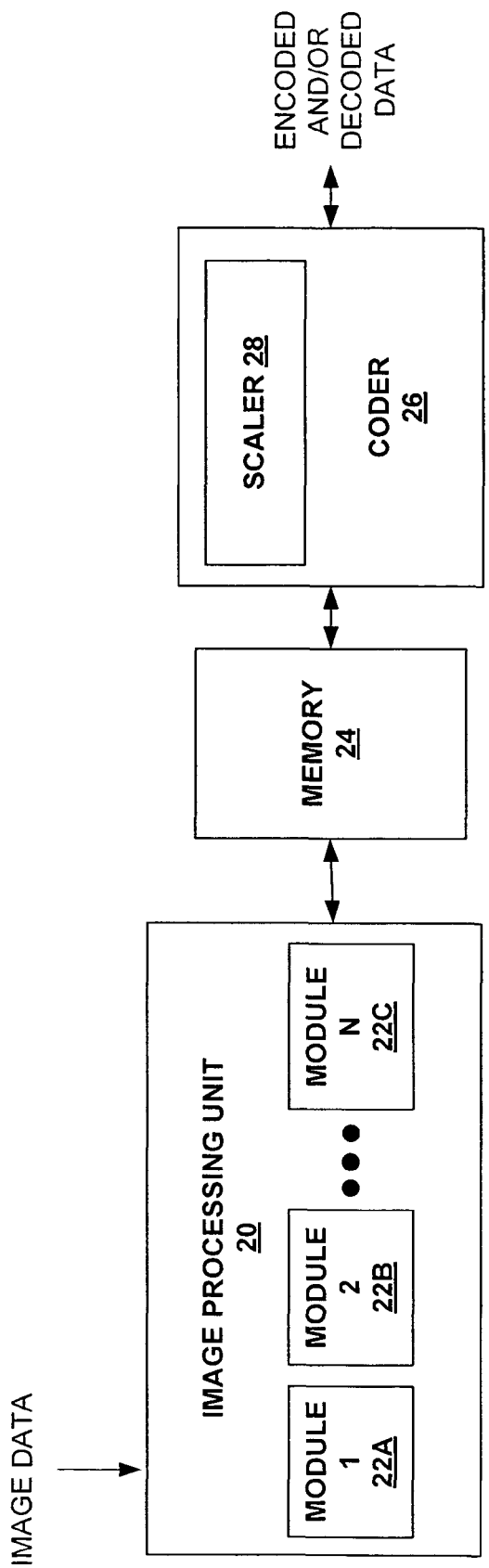
FIG. 2 illustrates components that may be implemented in the device of FIG. 1.

FIG. 2 illustrates components that may be implemented in the device 2 of FIG. 1. FIG. 2 illustrates an image processing unit or engine 20, a memory or buffer 24, and a coder 26 (also called an encoder/decoder, codec, compression engine or back end processor). A video processing system usually includes a front-end processor, such as the image processing unit 20, that captures the real-time image and a back-end processor, such as the coder 26, that performs video/image encoding.

The image processing unit 20 in FIG. 2 may include any number of image processing modules 22 (labeled 22A, 22B and 22C and collectively referred to as "modules 22"). The modules 22 may include an image sensor interface, a demosaicing module, a lens rolloff correction module, a scaling module, a color correction module, a color conversion module, and a spatial filtering module, or other front-end image processing modules.

Front-end image processing by the modules 22 may be sequential. A first process may be performed in its entirety, before a next process can be performed with respect to a given image. Some processes may be performed in parallel with respect to several different images of a sequence. Some modules 22 may perform the same function, which allows the function to be performed in parallel on different images.

In a first configuration, the image processing unit 20 includes a scaler to downscale (i.e., downsample or decimation) or upscale (i.e., upsample or interpolation) images. Scaling may be associated with other image processing techniques. Upsampling (or upscaling) may be performed last or near the end of the pipeline in the image processing unit 20 because (a) upsampling does not add any new information to the image, and (b) it is desirable to reduce the amount of data processing that is performed in other image processing modules 22 to save power and area in line buffers. Upsampling may be done either to resize an image for proper display or for digital zoom purposes. A simple form of 2× upsampling uses a box filter where each pixel is duplicated to be a 4×4 block, which is used to reconstruct the output image. Numerous algorithms may be used for upsampling.

The front-end image processing unit 20 sends processed data to the memory 24 (e.g., external memory) for storage until the data can be further processed for either Joint Photographic Experts Group (JPEG) or MPEG encoding by the coder 26, which may operate on an image macroblock basis. The coder 26 may encode and/or decode data according to MPEG or JPEG standards or other standards. In this first configuration, there is no scaler in the coder 26.

In a second configuration, as shown in FIG. 2, the coder 26 includes a scaler 28, which may be a configurable up and/or down scaler. The coder 26 may be any implementation of a JPEG or MPEG encoder. The coder 26 fetches processed image data macroblock-by-macroblock and processes the macroblocks. By embedding a scaler 28 in the coder 26, less space in memory 24 is needed whenever a final desired output size is larger than a native input size (resolution) from the image processing unit 20. When an image is enlarged or upscaled, the amount of data to be processed or stored may increase, for example, by a factor of 2*N, where N is the upsampling factor. If the scaler 28 upsamples an image as part of the coder's read operation from the memory 24, i.e., while the coder 26 fetches processed image data from the memory 24, then size requirements for the memory 24, external bandwidth, area and power may be reduced without sacrificing quality. In one embodiment, the scaler is configurable to upscale to a plurality of dimensions.

The components in FIG. 2 may be used in a reduced power video processing device.

The coder 26 may have an internal buffer to store macroblock data that is read from the memory 24. The coder 26 may use a double buffer so the coder 26 can process one macroblock while fetching a next macroblock. If the scaler 28 upsamples as part of the coder's read operation from the memory 24, then only ¼ of the fetches to the memory 24 would be required (for 2× upsampling) compared to the first configuration described above, because only the original un-upsampled image is fetched from the memory 24. The reduction in number of fetches to the memory 24 may result in significant power savings. There is no loss of quality compared to the first configuration (upsampling as the last stage in the image processing unit 20).

Another advantage of having the coder 26 perform upsampling is that the amount of the memory 24 required to store the output from the image processing unit 20 may also be reduced by a factor of 4 (for 2× upsampling).

If upsampling is performed in the image processing unit 20 (as in the first configuration), and the image is being processed in real-time from an image sensor, then the pipeline of modules 22 has to be run at the upsampled data rate in order to keep up. This means the hardware either needs to be larger to incorporate more parallel activities or run at a faster clock speed. As upsampling factors increase, this may quickly become unfeasible.

If the coder 26 performs upsampling (in the second configuration), the image processing unit 20 can run at a minimum clock rate as designated by the data rate coming from the image sensor.

Upsampling in the image processing unit 20 may also require line buffers if the image is upsampled in the vertical direction. The line buffer size may be dictated by a horizontal width of the image being processed. To support higher DSC resolutions, this line buffer can be significantly large. A 4MP image sensor has a width of 2272 pixels, which may use a RAM size of 2272×10 bits per line buffer. The number of line buffers required may be determined by a number of taps used in a vertical filter.

If the coder 26 performs upsampling, line buffers may still be used. But since the coder 26 only processes on a macroblock basis of 16×16 pixels, the size of these line buffers can be significantly smaller, which provides a reduction in area and power.

Another potential advantage of moving upsampling to the coder 26 is the RAM buffers (used to account for bus latency at the output of the image processing unit 20) can be reduced in size since the maximum data rate that needs to be supported at the output of the unit 20 may be reduced by a factor of 4.

The proposed scaler architecture in FIG. 2 may designed such that some hardware, such as adders and multipliers, etc., can be shared or used for both smooth upscaling and downscaling, which results in a configurable architecture that is area efficient.

In a system where an image front-end processor is integrated with a video/image encoder, the front-end processor and video/image encoder can be partitioned such that overall memory bandwidth, area and power required to implement video processing may be reduced.

If the coder 26 uses a double buffer to pipeline fetch and process macroblocks, then the coder 26 should be able to read from the memory 24 plus upsample the macroblock within an amount of time for processing a macroblock, or else there may be stalling in the coder pipeline. If the upsampling takes longer than a macroblock processing time, then there may be a slight reduction in overall video performance. This may be resolved by adding more internal buffers to cover this latency.

Figure 3:
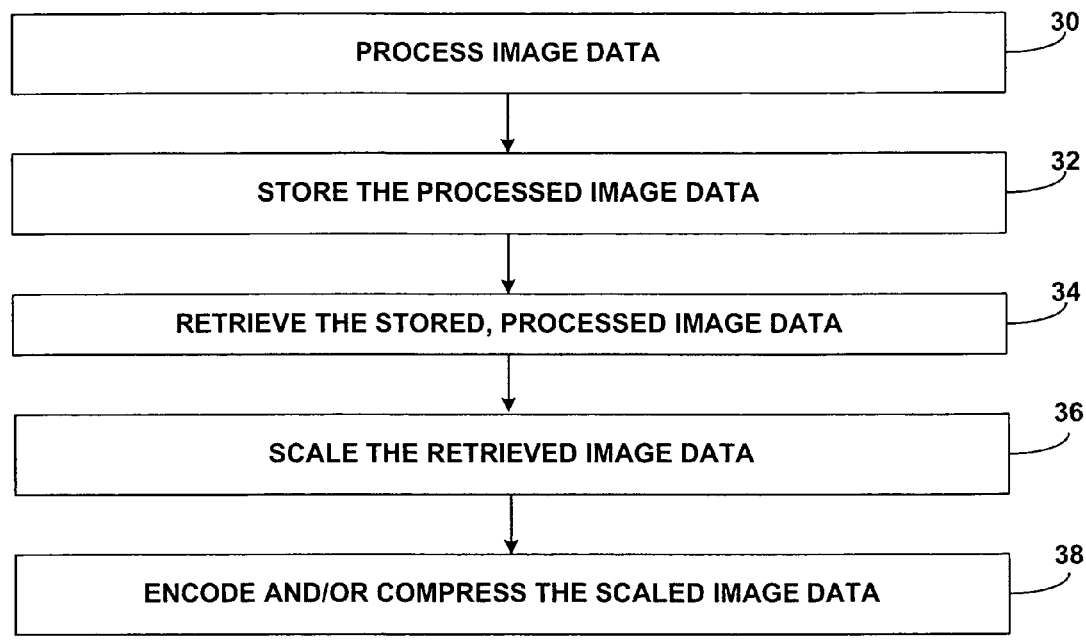
FIG. 3 illustrates a method of using the device of FIG. 1.

FIG. 3 illustrates a method of using the components in FIG. 2. In block 30, image data is processed. In block 32, processed image data is stored. In block 34, stored image data is retrieved. In block 36, retrieved image data is scaled. In block 38, scaled image data is encoded and/or compressed.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An apparatus comprising:
   an image processing unit;
   a memory configured to store processed image data from the image processing unit image data from the image processing unit,
   wherein the processed image data, stored to the memory from the image processing unit, has not been upscaled; and
   a coder configured to retrieve the stored, processed image data from the memory, the coder comprising a scaler configured to upscale the retrieved image data from the memory, the coder being configured to encode the upscaled image data,
   wherein the image processing unit and the coder are configured to communicate the processed image data with the memory via a common communication bus and
   wherein the scaler is configurable to upscale to a plurality of different dimensions.

2. The apparatus of claim 1, wherein the image processing unit is configured to perform at least one of demosaicing, lens rolloff correction, scaling, color correction, color conversion, and spatial filtering.

3. The apparatus of claim 1, wherein the memory is external to the image processing unit and coder.

4. The apparatus of claim 1, wherein the coder is configured to compress the retrieved image data.

5. The apparatus of claim 4, wherein the coder is configured to compress image data according to at least one of MPEG, JPEG, ITU H.263, and ITU H.264 standards.

6. The apparatus of claim 1, wherein the coder comprises a double buffer that enables substantially simultaneous retrieving and upscaling of image data.

7. The apparatus of claim 1, wherein the apparatus is a mobile communication device, the apparatus further comprising a transmitter configured to transmit the encoded image data over a wireless communication channel.

8. The apparatus of claim 1, wherein the scaler is configurable to upscale and downscale retrieved image data.

9. The apparatus of claim 1, wherein the coder comprises a video coder.

10. A method comprising:
    processing image data with a first processing unit;
    storing, from the first processing unit, the processed image data in a memory via a communication bus, wherein the stored image data has not been upscaled;
    retrieving the stored image data from the memory with a second processing unit that is configured to communicate data with the first processing unit via the communications bus that is common to the first and second processing units;
    upscaling the retrieved image data with the second processing unit, wherein the second processing unit is configurable to upscale to a plurality of different dimensions; and
    encoding the scaled image data with the second processing unit.

11. The method of claim 10, wherein encoding comprises compressing the retrieved image data according to at least one of MPEG, JPEG, ITU H.263 and ITU H.264 standards.

12. The method of claim 10, wherein encoding comprises video encoding.

13. The method of claim 10, wherein processing the image data comprises at least one of demosaicing, lens rolloff correction, scaling, color correction, color conversion, and spatial filtering.

14. The method of claim 10, further comprising buffering the retrieved image data.

15. The method of claim 10, further comprising transmitting the encoded image data over a wireless communication channel.

16. The method of claim 10, further comprising configuring an amount of upscaling.

17. An apparatus comprising:
    a means for processing an image;
    a means for storing the processed image; and
    a means for (a) retrieving the stored, processed image, (b) upscaling the retrieved image, and (c) encoding the upscaled image,
    wherein the means for upscaling is configurable to upscale to a plurality of different dimensions.

18. The apparatus of claim 17, wherein the means for processing the image is configured to perform at least one of demosaicing, lens rolloff correction, scaling, color correction, color conversion, and spatial filtering.

* * * * *